(12) United States Patent
Tang

(10) Patent No.: US 10,447,195 B2
(45) Date of Patent: Oct. 15, 2019

(54) ELECTRIC VEHICLE MOTOR TORQUE SAFETY MONITOR

(71) Applicant: Atieva, Inc., Redwood City, CA (US)

(72) Inventor: Yifan Tang, Redwood City, CA (US)

(73) Assignee: Atieva, Inc., Newark, CA (US)

( * ) Notice: Subject to any disclaimer, the term of this patent is extended or adjusted under 35 U.S.C. 154(b) by 307 days.

(21) Appl. No.: 13/948,307

(22) Filed: Jul. 23, 2013

(65) Prior Publication Data

US 2015/0028785 A1    Jan. 29, 2015

(51) Int. Cl.
| | | |
|---|---|---|
| H02P 29/024 | (2016.01) | |
| H02P 29/032 | (2016.01) | |
| B60L 3/00 | (2019.01) | |
| B60L 3/12 | (2006.01) | |
| B60L 15/20 | (2006.01) | |
| B60W 50/038 | (2012.01) | |
| B60W 50/029 | (2012.01) | |
| B60W 20/50 | (2016.01) | |

(52) U.S. Cl.
CPC .......... *H02P 29/027* (2013.01); *B60L 3/0061* (2013.01); *B60L 3/12* (2013.01); *B60L 15/20* (2013.01); *B60W 50/038* (2013.01); *H02P 29/032* (2016.02); *B60L 2240/12* (2013.01); *B60L 2240/421* (2013.01); *B60L 2240/423* (2013.01); *B60L 2240/429* (2013.01); *B60W 20/50* (2013.01); *B60W 2050/0295* (2013.01); *B60W 2510/083* (2013.01); *Y02T 10/645* (2013.01); *Y02T 10/72* (2013.01); *Y02T 10/7275* (2013.01)

(58) Field of Classification Search
CPC .............................. B60W 10/06; B60W 10/08
USPC .......... 318/139, 432, 476, 490, 567; 701/22, 701/31.1, 33.7
See application file for complete search history.

(56) References Cited

U.S. PATENT DOCUMENTS

| | | | | |
|---|---|---|---|---|
| 529,487 A | * | 11/1894 | Imaseki | A01K 1/04 119/791 |
| 4,528,486 A | * | 7/1985 | Flaig | H02P 6/24 318/400.21 |
| 5,294,871 A | * | 3/1994 | Imaseki | B60L 3/10 318/139 |

(Continued)

FOREIGN PATENT DOCUMENTS

| | | |
|---|---|---|
| DE | 10251095 | 5/2004 |
| DE | 102010017863 | 5/2004 |

OTHER PUBLICATIONS

Notification of Transmittal of the International Search Report and the Written Opinion of the International Searching Authority, PCT/US2014/047657, dated Jan. 12, 2015.

*Primary Examiner* — Shawki S Ismail
*Assistant Examiner* — Devon A Joseph
(74) *Attorney, Agent, or Firm* — Womble Bond Dickinson (US) LLP

(57) ABSTRACT

A safety system for an electric motor controller is provided. The safety system includes a torque safety monitor having a first processor distinct from a second processor of a main motor controller. The first processor is configured to one of decrease or shut down AC (alternating current) power, sent from a DC/AC (direct current to alternating current) inverter to an electric motor, in response to an estimated torque of the electric motor differing from a commanded torque associated with the main motor controller by more than a set amount.

20 Claims, 3 Drawing Sheets

(56) References Cited

U.S. PATENT DOCUMENTS

| | | | |
|---|---|---|---|
| 5,442,268 A * | 8/1995 | Goodarzi | B60L 15/20 318/432 |
| 6,295,487 B1 | 9/2001 | Ono et al. | |
| 6,469,462 B2 | 10/2002 | Shimane et al. | |
| 6,490,511 B1 * | 12/2002 | Raftari | B60K 6/365 180/65.1 |
| 6,625,524 B2 | 9/2003 | Yamaguchi | B60L 50/15 701/22 |
| 6,781,333 B2 * | 8/2004 | Koide | H02P 21/00 318/432 |
| 6,803,736 B1 * | 10/2004 | Hommel | G05B 9/02 180/404 |
| 7,407,027 B2 | 8/2008 | Matsuda | |
| 7,737,652 B2 | 6/2010 | Schwesig | |
| 7,996,138 B2 * | 8/2011 | Rehm | F02D 11/105 701/84 |
| 8,108,096 B2 * | 1/2012 | Dlugoss | G01L 25/003 477/906 |
| 8,112,192 B2 | 2/2012 | Heap | |
| 8,148,937 B2 | 4/2012 | Itoh et al. | |
| 8,155,815 B2 * | 4/2012 | Cawthorne | B60W 20/15 701/33.7 |
| 8,212,511 B2 * | 7/2012 | Dean | H02H 7/0816 318/432 |
| 8,244,426 B2 | 8/2012 | Buur | |
| 8,432,118 B2 * | 4/2013 | Lind | H02P 29/027 318/476 |
| 8,706,346 B2 | 4/2014 | Wang et al. | |
| 2004/0147366 A1 | 7/2004 | Aoki et al. | |
| 2004/0254695 A1 * | 12/2004 | Komiyama | B60W 50/16 701/22 |
| 2006/0276941 A1 * | 12/2006 | Sugita | B60K 6/44 701/1 |
| 2007/0126392 A1 * | 6/2007 | Suzuki | B62D 5/046 318/807 |
| 2008/0061721 A1 * | 3/2008 | Schwesig | H02P 27/06 318/434 |
| 2009/0112392 A1 * | 4/2009 | Buur | B60W 10/08 701/31.4 |
| 2010/0001671 A1 | 1/2010 | Yamada et al. | |
| 2010/0100263 A1 * | 4/2010 | Aoki | B60K 6/445 701/22 |
| 2010/0102767 A1 | 4/2010 | Endo et al. | |
| 2010/0250041 A1 * | 9/2010 | Li | B60K 6/48 701/22 |
| 2010/0295492 A1 * | 11/2010 | Chakrabarti | B60L 3/0038 318/490 |
| 2011/0295459 A1 | 12/2011 | Shin et al. | |
| 2012/0109431 A1 * | 5/2012 | Wang | B60L 3/0061 701/22 |
| 2012/0153884 A1 * | 6/2012 | Lindsey | B60L 11/182 318/500 |
| 2012/0187884 A1 * | 7/2012 | Gaiser | G05B 9/03 318/490 |
| 2012/0239236 A1 * | 9/2012 | Eom | B60L 15/20 701/22 |
| 2012/0280644 A1 * | 11/2012 | Lind | H02P 29/0044 318/476 |
| 2012/0310454 A1 * | 12/2012 | Ganley et al. | 701/22 |
| 2013/0253749 A1 | 9/2013 | Hayashi et al. | |
| 2014/0081499 A1 | 3/2014 | Ito | |
| 2014/0184125 A1 * | 7/2014 | Fu | H02P 29/02 318/490 |

* cited by examiner

ELECTRIC VEHICLE MOTOR TORQUE SAFETY MONITOR

BACKGROUND

Motor controls for electric and hybrid vehicles are complex systems. Any sufficiently complex system can undergo failure from a variety of causes. Many modern automobiles have a black box recorder, which records data during operation of the automobile. These black boxes can be used to diagnose failure after the fact. Many modern automobiles have onboard diagnostics, which can diagnose failure of a component or a system during operation of the automobile. Yet, because electric and hybrid vehicle systems are still relatively new, there is a need in the art for a solution which improves upon previously available monitoring and diagnostic systems.

SUMMARY

In some embodiments, a safety system for an electric motor controller is provided. The safety system includes a torque safety monitor having a first processor distinct from a second processor of a main motor controller. The first processor is configured to one of decrease or shut down AC (alternating current) power, sent from a DC/AC (direct current to alternating current) inverter to an electric motor, in response to an estimated torque of the electric motor differing from a commanded torque associated with the main motor controller by more than a set amount.

In some embodiments, a safety system for a vehicle is provided. The safety system includes a torque safety monitor, distinct from a main motor controller of a vehicle. The torque safety monitor includes a torque estimator that produces an estimated torque from inputs including a measurement of a stator current of a motor and a rotational speed of the motor, the motor controlled by the main motor controller via the torque safety monitor. The torque safety monitor includes a torque monitor that performs a comparison of the estimated torque and a commanded torque, where the commanded torque is an input to the main motor controller. The torque safety monitor includes a status and failure processor operable to output a protection directive based on the comparison of the estimated torque and the commanded torque. The protection directive acting to modify switching signals from the main motor controller to decrease AC (alternating current) power delivered to the motor.

In some embodiments, a method of monitoring an electric motor is provided. The method includes comparing an estimated torque of an electric motor to a commanded torque. The method includes producing reduced power level switching signals, for a DC/AC (direct current to alternating current) inverter, from switching signals received from a main motor controller, in response to the estimated torque of the electric motor differing from the commanded torque by a preset amount.

Other aspects and advantages of the embodiments will become apparent from the following detailed description taken in conjunction with the accompanying drawings which illustrate, by way of example, the principles of the described embodiments.

BRIEF DESCRIPTION OF THE DRAWINGS

The described embodiments and the advantages thereof may best be understood by reference to the following description taken in conjunction with the accompanying drawings. These drawings in no way limit any changes in form and detail that may be made to the described embodiments by one skilled in the art without departing from the spirit and scope of the described embodiments.

DETAILED DESCRIPTION

Figure 1:
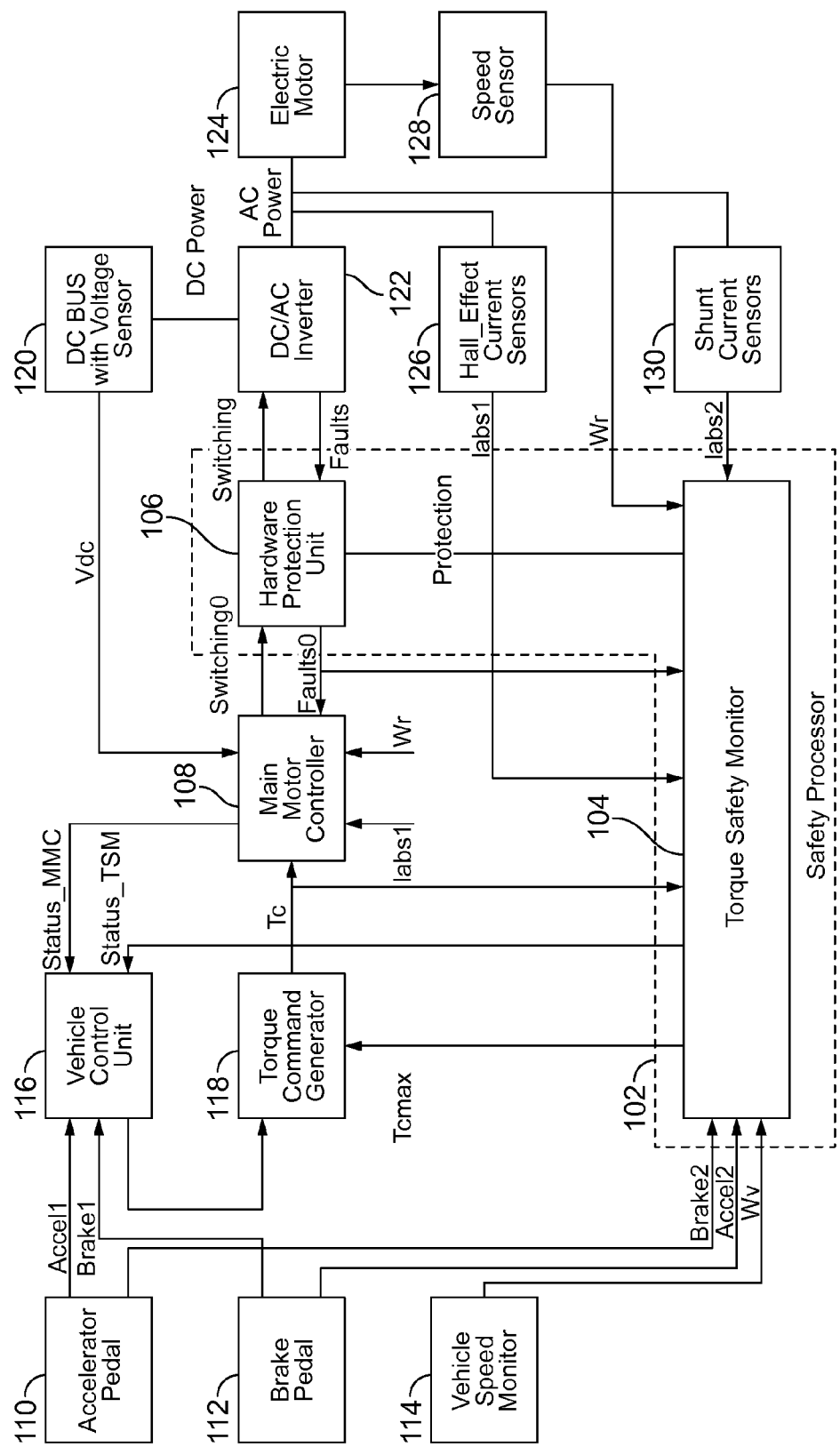
FIG. 1 is a schematic diagram of an electric vehicle motor control system, with a torque safety monitor and a hardware protection unit, in accordance with the present invention.

Generally, in electric motor control systems for electric and hybrid vehicles, a main motor controller sends pulse width modulation (PWM) control signals to a DC (direct current) to AC (alternating current) inverter. The DC/AC inverter then sends three-phase AC to an AC electric motor. The AC electric motor can be a permanent magnet AC motor, an induction motor, or one of other types of AC motors. Without limitation and for illustration purpose, an induction motor is given as an example load throughout the following illustration of the electric motor control system. In the present electric motor control system, the main motor controller sends the PWM control signals to a safety monitor. The safety monitor uses different control and measurement sensors than the main controller and runs code on a separate microcontroller, in some embodiments. The safety monitor has input from a torque command generator and the DC/AC inverter, in addition to the PWM control signals from the main motor controller. The safety monitor uses vehicle control information, including accelerator, brake, and vehicle speed, and motor information, including the rotational speed of the rotor, and the stator current. From all of this, the safety monitor derives the PWM control signals to send to the DC/AC inverter. As in previous electric motor control systems, the DC/AC inverter sends three-phase AC to the induction motor. A speed sensor coupled to the induction motor sends motor speed information to the main motor controller. The safety monitor thus protects against faults undetected by the main controller, and acts directly on controlling the inverter. Such faults include unintended vehicle acceleration, inverter malfunction, motor malfunction and speed sensor malfunctions. Since the main commands, in the form of the PWM control signals, go through the safety monitor, the safety monitor can correct for malfunctions in other parts of the system and issue corrected PWM control signals.

Detailed illustrative embodiments are disclosed herein. However, specific functional details disclosed herein are merely representative for purposes of describing embodiments. Embodiments may, however, be embodied in many alternate forms and should not be construed as limited to only the embodiments set forth herein.

It should be understood that although the terms first, second, etc. may be used herein to describe various steps or calculations, these steps or calculations should not be limited by these terms. These terms are only used to distinguish one step or calculation from another. For example, a first calculation could be termed a second calculation, and, similarly, a second step could be termed a first step, without departing from the scope of this disclosure. As used herein, the term "and/or" and the "/" symbol includes any and all combinations of one or more of the associated listed items.

As used herein, the singular forms "a", "an" and "the" are intended to include the plural forms as well, unless the context clearly indicates otherwise. It will be further understood that the terms "comprises", "comprising", "includes", and/or "including", when used herein, specify the presence of stated features, integers, steps, operations, elements, and/or components, but do not preclude the presence or addition of one or more other features, integers, steps, operations, elements, components, and/or groups thereof. Therefore, the terminology used herein is for the purpose of describing particular embodiments only and is not intended to be limiting.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

As shown in FIG. 1, the safety monitor 102 interposes between the main motor controller 108 and the DC/AC inverter 122 in an electric vehicle motor control system. The safety monitor 102 includes a torque safety monitor 104, which performs monitoring and directive functions, and a hardware protection unit 106, which modifies switching signals sent from the main motor controller 108 and destined for the DC/AC inverter 122. The torque safety monitor 104 and the hardware protection unit 106 are coupled to each other and cooperate to monitor various sensor values, conditions and other parameters of the motor and the vehicle, and decrease or turn off the AC power sent to the electric motor 124 in the event of certain problems. The torque safety monitor 104 receives a variety of status parameters and outputs system status information and a protection directive, based upon the status parameters.

The hardware protection unit 106 is electrically interposed between the main motor controller 108 and the DC/AC inverter 122. The hardware protection unit 106 is configured to modify switching signals "Switching0" from the main motor controller 108, to "Switching" destined for the DC/AC inverter 122. The hardware protection unit 106 does so in response to the torque safety monitor 104 directing to decrease or shut down the AC power sent from the DC/AC inverter 122 to the electric motor 124. An overview of the electric vehicle motor control system is presented below, followed by a description of the safety monitor 102.

An accelerator pedal assembly 110 and a brake pedal assembly 112 provide control inputs Accel1, Brake1 to a vehicle control unit 116. The vehicle control unit 116 generates an initial commanded torque Tc0, which is sent to the torque command generator 118. From the initial commanded torque Tc0 and a maximum commanded torque Tcmax, which is treated as a torque upper limit, the torque command generator 118 generates a commanded torque Tc, which is input to the main motor controller 108. From the commanded torque Tc, a measured rotational speed Wr of the rotor of the electric motor 124 (an induction motor), and a first measured stator current Iabs1 of at least two phases of the electric motor 124, the main motor controller generates switching signals Switching0. Were it not for the safety monitor 102, the switching signals Switching0 would go directly to the DC/AC inverter 122, which would apply these signals to generate AC power for the electric motor 124 from the DC bus 120.

However, the safety monitor 102 intercepts the switching signals Switching0. Particularly, the hardware protection unit 106 receives the switching signals Switching0 from the main motor controller 108, modifies them in accordance with a protection directive Protection from the torque safety monitor 104, and outputs the modified switching signals Switching to the DC/AC inverter 122. Additionally, the hardware protection unit 106 receives one or more fault parameters Faults from the DC/AC inverter 122, and outputs a fault status Faults0 to both the main motor controller 108 and the torque safety monitor 104.

As part of a safety system for an electric motor controller or a vehicle, the safety monitor 102 can be implemented in various ways. In one embodiment, the torque safety monitor has a processor. The main motor controller also has a processor. The processor of the torque safety monitor 104 is distinct from the processor of the main motor controller. In another embodiment, the torque safety monitor 104 is distinct from the main motor controller 108 of the vehicle. The processor of the torque safety monitor 104 is configured to decrease or shut down the AC power that is sent from the DC/AC inverter 122 to the electric motor 124. It does so by sending the appropriate protection directive Protection to the hardware protection unit 106 when the estimated torque of the electric motor 124 differs from the commanded torque Tc by more than a set amount. The commanded torque Tc is associated with the main motor controller 108, as described above. The set amount could be a fixed constant, a variable dependent on motor speed, or a variable dependent upon vehicle speed, among other possibilities. In one embodiment, a predetermined delay is applied to the commanded torque Tc prior to comparing the commanded torque to the estimated torque, in order to compensate for the path delay of the estimated torque. Also, in one embodiment, the torque safety monitor 104 sends out a decreased maximum commanded torque Tcmax, in response to the estimated torque of the electric motor differing from the commanded torque by more than the set amount. The safety monitor 102 could be implemented as an FPGA (field programmable gate array), or a PLD (programmable logic device), or could use a DSP (digital signal processor), a microcontroller or other processor to execute steps of a method.

A variety of parameters are monitored by the torque safety monitor 104 in the safety monitor 102. The torque safety monitor receives a second set of control inputs Accel2, Brake2 from the accelerator pedal assembly 110 and the brake pedal assembly 112. In one embodiment, the accelerator pedal assembly 110 uses two different sensors, the first of which provides the first acceleration parameter Accel1 to the vehicle control unit 116, the second of which provides the second acceleration parameter Accel2 to the torque safety monitor 104. In one embodiment, the brake pedal assembly 112 uses two different sensors, the first of which provides the first brake parameter Brake1 to the vehicle control unit 116, the second of which provides the second brake parameter Brake2 to the torque safety monitor 104. In further embodiments, these parameters are provided through separate wires, or separate buses, or use other forms of redundancy such that the torque safety monitor 104 can monitor accelerator and brake sensors and activity independently from the vehicle control unit 116.

The torque safety monitor also receives a vehicle speed Wv measurement from a vehicle speed monitor 114. This could be from a wheel sensor or a combination of wheel sensors, a speedometer, a transmission or transaxle sensor etc. A speed sensor 128, coupled to the electric motor 124, provides a rotational speed Wr measurement of the rotor of the electric motor 124 to the torque safety monitor 104 and to the main motor controller 108. This could be from a sensor coupled to the rotor of the electric motor 124.

The torque safety monitor 104 receives two different measurements of the stator current Iabs1, Iabs2. In various embodiments, the measurements of the stator currents are provided by two sensors of different locations, or two sensors of differing types. In one embodiment, a first measurement of the stator current Iabs1 is provided by Hall-effect current sensors 126, and a second measurement of the stator current Iabs2 is provided by shunt current sensors 130. These various sensors could measure current on at least two phases of the stator. Using differing sensors, or even sensors of differing types, allows independent measurements of stator current to be compared in the torque safety monitor 104. Providing a measurement of the stator current to the torque safety monitor 104 allows the torque safety monitor 104 to measure aspects of the AC power provided to the electric motor 124 by the DC/AC inverter 122, and particularly allows the torque safety monitor 104 to estimate the torque produced by the electric motor 124.

Figure 2:
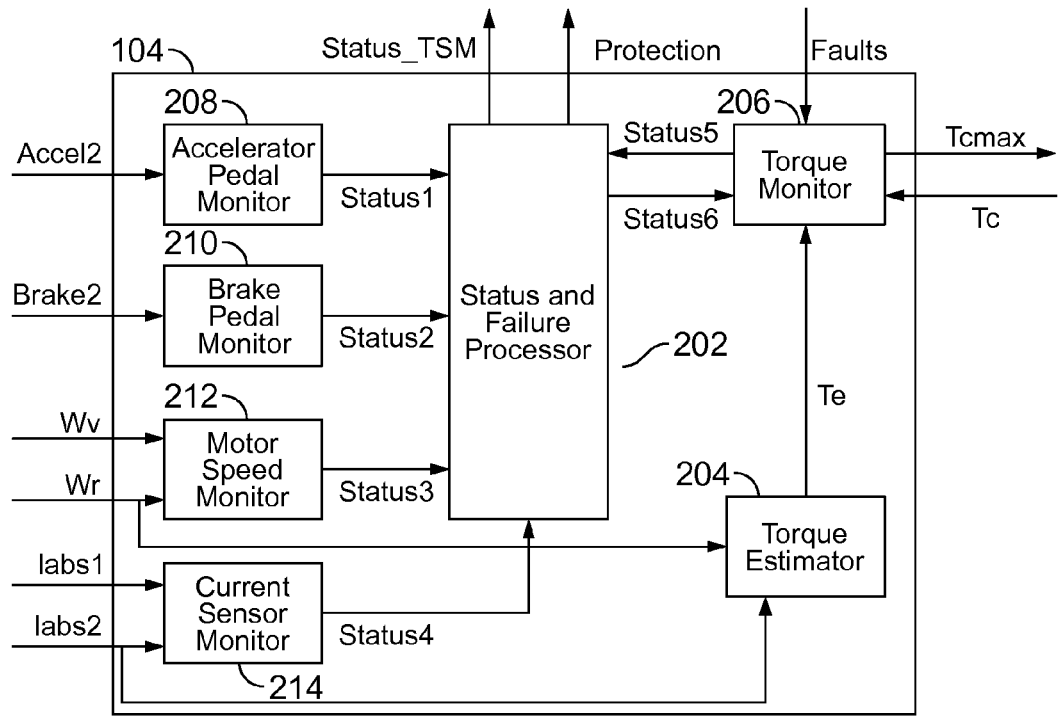
FIG. 2 is a schematic diagram of the torque safety monitor of FIG. 1.

FIG. 2 shows an embodiment of the torque safety monitor 104 in greater detail. In this embodiment, the torque safety monitor 104 includes a status and failure processor 202, a torque estimator 204, a torque monitor 206, an accelerator pedal monitor 208, a brake pedal monitor 210, a motor speed monitor 212, and a current sensor monitor 214. The torque estimator 204 produces an estimated torque Te from inputs including a measurement of a stator current Iabs2 of the electric motor 124 and the rotational speed Wr of the electric motor 124. In certain enhancements, one or more additional measured or estimated inputs may be beneficial for the torque estimator 204 to produce the estimated torque Te. As above, the electric motor 124 is controlled by the main motor controller 108, via the safety monitor 102. In one embodiment, the torque estimator 204 includes a model of the electric motor 124. This could represent a steady state model or a dynamic model of torque based upon rotor speed and stator current. Embodiments could be lookup-table-based or real-time calculation-based.

The torque monitor 206 performs a comparison of the estimated torque Te and the commanded torque Tc, which are received by the torque monitor 206 as inputs. The torque monitor also receives the one or more fault parameters Faults from the DC/AC inverter 122, and interacts with the status and failure processor 202 by sending a status status5 to the status and failure processor 202 and receiving a status status6 from the status and failure processor 202.

In some embodiments, the torque monitor 206 sets the commanded maximum torque Tcmax to equal the commanded torque Tc if the commanded torque Tc and the estimated torque Te are close, and sets the commanded maximum torque Tcmax to the lesser of the two if these are very different. In performing this action, embodiments could use the commanded torque Tc or a delayed version of the commanded torque Tc. In one embodiment, the torque monitor sets the commanded maximum torque Tcmax equal to the present value of the commanded torque Tc in response to the estimated torque Te equaling the delayed commanded torque to within a specified amount. The torque monitor sets the commanded maximum torque Tcmax equal to the lesser of the estimated torque Te and the present value of the commanded torque Tc in response to the estimated torque Te differing from the delayed commanded torque by more than the specified amount. This specified amount could be a fixed constant, or a variable dependent upon vehicle speed, motor speed or other parameters, in various embodiments. In further embodiments, the commanded maximum torque Tcmax could be decreased gradually, as a function of time, or set to an intermediate value.

The status and failure processor 202 is coupled to various monitors 208, 210, 212, 214, as shown in FIG. 2. Each monitor receives a sensed value relating to the electric motor 124 or the vehicle, and communicates a status to the status and failure processor 202. The status and failure processor 202 outputs an aggregated status Status_TSM relating to the status of one or more of the monitors 206 208, 210, 212, 214 and/or the faults of the DC/AC inverter 122 as relayed by the hardware protection unit and the fault status Faults0.

In some embodiments, the main motor controller 108 communicates status and fault information, based in part on the fault status Faults0, via a status Status_MMC to the vehicle control unit 116, as shown in FIG. 1. The vehicle control unit 116 could use the status Status_MMC from the main motor controller 108 and/or the status Status_TSM from the torque safety monitor 104, specifically from the status and failure processor 202, to produce warnings on a dashboard display or to reduce the commanded torque Tc0, in various embodiments.

In addition to conveying the aggregated status Status_TSM, the status and failure processor 202 outputs the protection directive Protection, which is sent from the torque safety monitor 104 to the hardware protection unit 106. The protection directive Protection could be sent via a wire, multiple wires, a port or a bus, in various embodiments, and could have various formats as appropriate to the system design. The protection directive communicates that the status and failure processor 202 has determined there is a failure in one or more of the subsystems being monitored, and is directing the hardware protection unit 106 to reduce the power level associated with the switching signals for the DC/AC inverter 122 and accordingly reduce AC power sent to the electric motor 124.

The accelerator pedal monitor 208 receives a sensor value Acce12 from the accelerator pedal assembly 110, as shown in FIG. 1. In the embodiment shown, the sensor value Acce12 from the accelerator pedal assembly 110 is redundant with the sensor value Acce11 sent from the accelerator pedal assembly 110 to the vehicle control unit 116. In one embodiment, the sensor value Acce12 from the accelerator pedal assembly 110 includes power supply and ground information, e.g., on a bus, so that the accelerator pedal monitor 208 can detect a ground or power supply fault of the accelerator pedal assembly 110 in addition to monitoring activity or settings of the accelerator pedal assembly 110. Status is communicated via a status status1, which could be a signal line, a port or a bus, from the accelerator pedal monitor 208 to the status and failure processor 202.

The brake pedal monitor 210 receives a sensor value Brake2 from the brake pedal assembly 112, as shown in FIG. 1. In the embodiment shown, the sensor value Brake2 from the brake pedal assembly 112 is redundant with the sensor value Brake2 sent from the brake pedal assembly 112 to the vehicle control unit 116. In one embodiment, the sensor value Brake2 from the brake pedal assembly 112 includes power supply and ground information, e.g., on a bus, so that the accelerator pedal monitor 208 can detect a ground or power supply fault of the brake pedal assembly 112 in addition to monitoring activity or settings of the brake pedal assembly 112. Status is communicated via a status status2, which could be a signal line, a port or a bus, from the brake pedal monitor 210 to the status and failure processor 202.

The motor speed monitor 212 receives the vehicle speed value Wv from the vehicle speed monitor 114 and receives the rotational speed Wr of the electric motor 124 from the speed sensor 128, as shown in FIG. 1. Applying an appropriate calculation, scaling one of these, or using a lookup table or other mechanism for adjusting the two parameters for comparison, the motor speed monitor 212 detects a discrepancy between the vehicle speed value Wv and the rotational speed Wr of the electric motor 124 exceeding a predetermined tolerance. In other words, if the vehicle speed and the rotational speed of the electric motor are inconsistent, i.e., out of tolerance with each other, the motor speed monitor 212 detects this.

In one embodiment, the motor speed monitor 212 can detect a ground or power supply fault in a vehicle speed sensor or a motor rotational speed sensor 128. In such an embodiment, the vehicle speed value Wv and the rotational speed Wr of the electric motor 124 could be supplied via buses and carry information about the power supply and ground connections as well as the requisite parameters. Status is communicated via a status status3, which could be a signal line, a port or a bus, from the motor speed monitor 212 to the status and failure processor 202.

The current sensor monitor 214 receives the two different measurements of the stator current Iabs1, Iabs2, and detects any discrepancy. A predetermined tolerance, and any scaling to allow for the differing types of sensors, could be applied in various embodiments. Status is communicated via a status status4, which could be a signal line, a port or a bus, from the current sensor monitor 214 to the status and failure processor 202.

Figure 3:
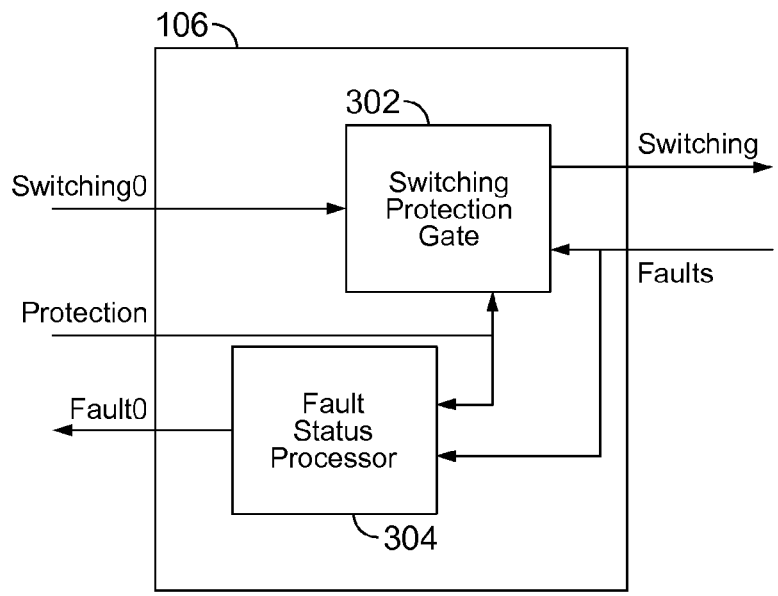
FIG. 3 is a schematic diagram of the hardware protection unit of FIG. 1.

FIG. 3 shows an embodiment of the hardware protection unit 106 in greater detail. In this embodiment, the hardware protection unit 106 includes a switching protection gate 302 and a fault status processor 304. The fault status processor 304 receives the protection directive Protection from the torque safety monitor 104, and receives the one or more fault parameters Faults from the DC/AC inverter 122. The fault status processor 304 communicates aspects of these or information derived from these to the main motor controller 108, via the fault status Faults0, which could be a signal line, a port or a bus.

The switching protection gate 302 receives the switching signals Switching0 from the main motor controller 108, modifies these in accordance with the protection directive Protection, and outputs the modified switching signals "Switching" to the DC/AC inverter 122. In one embodiment, the switching signals "Switching0" are sent by the main motor controller 108 to direct pulse width modulation in the DC/AC inverter 122. The switching signals "Switching0" are modified by the switching protection gate 302 to produce the modified switching signals "Switching" that reduce the voltage and current amplitudes of the pulse width modulated AC power signals sent from the DC/AC inverter 122 to the electric motor 124, when so directed by the protection directive Protection. When the protection directive Protection directs to not modify the switching signals "Switching0," i.e., when no fault is detected by the status and failure processor 202, the switching protection gate 302 passes through the switching signals Switching0 to the switching signals "Switching," unmodified. Under circumstances of a major fault, the protection directive Protection directs the switching protection gate 302 to produce the modified switching signals "Switching" that cut power altogether to the electric motor 124. The modified switching signals "Switching" are produced by the switching protection gate 302 in a manner consistent with the specification of the DC/AC inverter 122, and may be design dependent.

In one embodiment, the switching protection gate 302 sets the modified switching signals Switching equal to the switching signals "Switching0" in response to the fault parameter Faults from the DC/AC inverter 122 indicating no fault in the DC/AC inverter 122, and the protection directive Protection indicating agreement between the estimated torque Te and the commanded torque Tc. The switching protection gate sets the modifying switching signals "Switching" to reduced power levels or an "off" state of the DC/AC inverter in response to the fault parameter Faults from the DC/AC inverter 122 indicating a fault in the DC/AC inverter 122, or the protection directive Protection indicating disagreement between the estimated torque Te and the commanded torque Tc.

By employing connections to modules both upstream and downstream of the main motor controller 108, the safety monitor 102 can safeguard processes and protect against failures in various locations throughout the motor control system. For example, the connections from the safety monitor 102 to the vehicle control unit 116 and the torque command generator 118 can be used to cut the commanded torque Tc, which is an input to the main motor controller. Cutting the commanded torque Tc then results in the main motor controller 108 reducing the AC power (to the electric motor 124) called for by the switching signals "Switching0." On the other hand, the connections from the status and failure processor 202 to the switching protection gate 302 can be used to much more immediately cut the AC power called for by the switching signals "Switching0," by reducing the AC power called for by the modified switching signals "Switching" without waiting for the effects of the reduced commanded torque Tc to ripple through the main motor controller 108. This multiple-layered safety approach has aspects of fault tolerance and graceful system degradation, which are advantageously applied to benefit the user of a motor control system.

Figure 4:
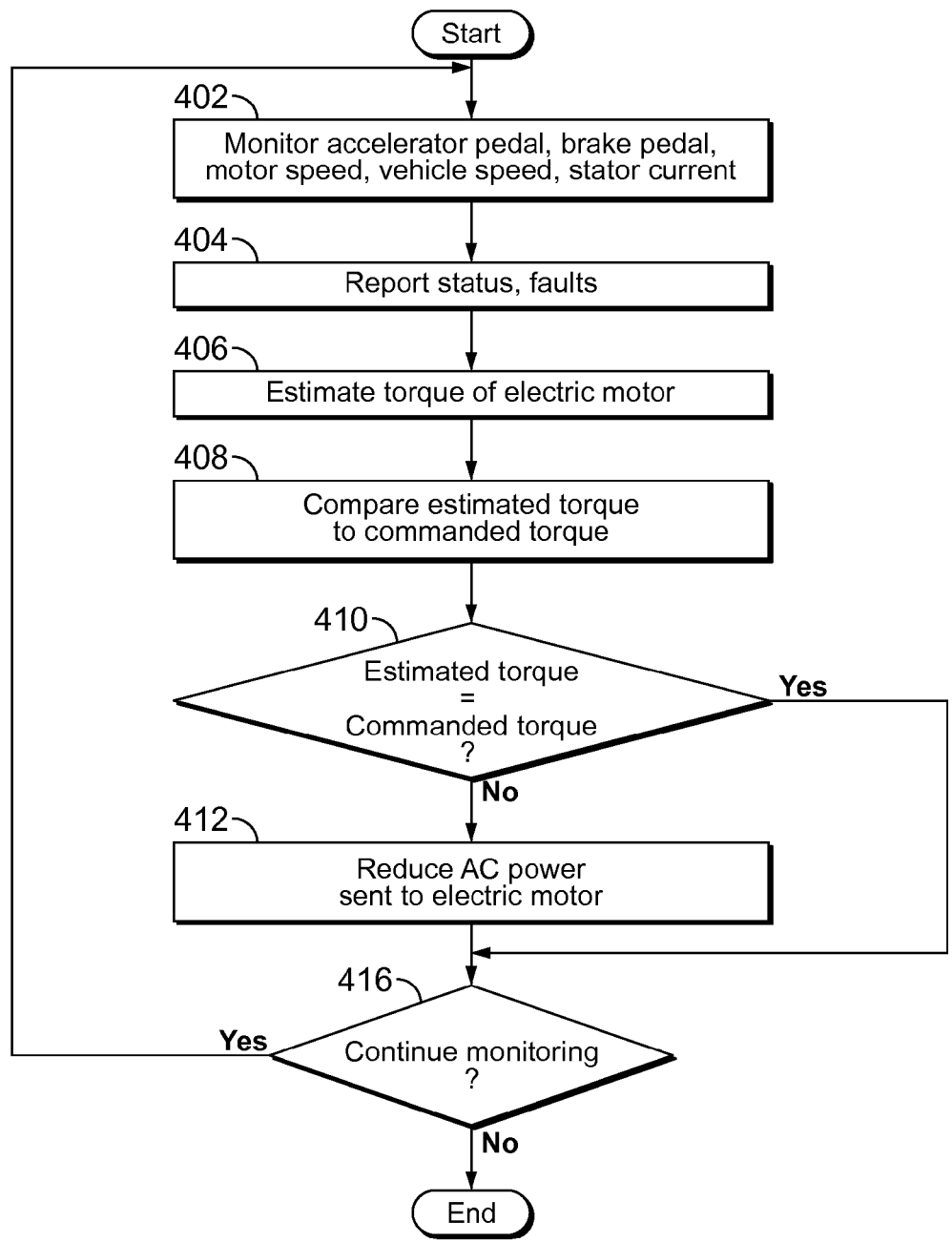
FIG. 4 is a flow diagram of a method of monitoring an electric motor, which can be practiced using the electric vehicle motor control system, torque safety monitor and hardware protection unit of FIG. 1.

FIG. 4 shows a method of monitoring electric motor, which can be practiced using the torque safety monitor of FIGS. 1-3. The method can be embodied using various types of processors, including one or more microcontrollers or DSPs, or logic as implemented on an FPGA or PLD. Examples of how actions of the method can be implemented are given below.

From a start point, the accelerator pedal, the brake pedal, the motor speed, the vehicle speed and the stator current are monitored, in an action 402. These can be monitored using the accelerator pedal monitor, the brake pedal monitor, the motor speed monitor, the current sensor monitor and/or the status and failure processor of FIGS. 1 and 2. In an action 404, status and faults are reported. These can be reported using status lines or buses of the monitors and/or the status and failure processor. A ground fault or a power supply fault in the accelerator pedal assembly, the brake pedal assembly, a vehicle speed sensor, or a motor rotational speed sensor could be reported to the vehicle control unit directly or via the main motor controller. A discrepancy between stator current measurements or a discrepancy between vehicle speed and motor speed could be reported to the vehicle control unit.

In an action 406, the torque of the electric motor is estimated. For example, the torque estimator in the torque safety monitor performs such an estimation. In an action 408, the estimated torque is compared to the commanded torque. For example, the torque monitor in the torque safety monitor can perform such a comparison, and report results to the status and failure processor. As a further example, the status and failure processor could perform such a comparison using status information from the torque monitor.

In a decision action 410, the question is asked, does the estimated torque equal the commanded torque? The torque monitor or the status and failure processor could make such a determination. A preset amount, which could be a constant or a variable in embodiments, could be applied as a threshold or tolerance for how close the estimated torque would need to be to the commanded torque. This could be a hard limit or a fuzzy limit, i.e., an exact expression or fuzzy logic could be used.

If the answer is yes, the estimated torque equals the commanded torque, e.g., to within a threshold or preset amount, flow continues to the action 416. In this situation, the switching signals from the main motor controller to the DC/AC inverter would be unchanged, i.e., the switching protection gate would not modify the switching signals.

If the answer is no, the estimated torque does not equal the commanded torque, then the AC power sent to the electric motor is reduced, in an action 412. For example, the switching protection gate could modify the switching signals from the main motor controller in response to being notified to do so by the protection directive from the torque safety monitor. The switching protection gate could then send the modified switching signals to the DC/AC inverter, to reduce the AC power the DC/AC inverter sends to the electric motor. This could occur when the estimated torque differs from the commanded torque by more than a threshold or preset amount. In one embodiment, this could occur when a delayed version of the estimated torque differs from the commanded torque by more than the threshold or preset amount. Flow then continues with the action 416.

In the decision action 416, the question is asked, should the monitoring continue? If the answer is no, the monitoring should not continue, the flow branches to an endpoint, or elsewhere in further embodiments. If the answer is yes, the monitoring should continue, the flow branches back to the action 402, in order to continue monitoring. In further embodiments, other branchings could take place, or some actions could take place in parallel with other actions or in differing orders, etc.

With the above embodiments in mind, it should be understood that the embodiments might employ various computer-implemented operations involving data stored in computer systems. These operations are those requiring physical manipulation of physical quantities. Usually, though not necessarily, these quantities take the form of electrical or magnetic signals capable of being stored, transferred, combined, compared, and otherwise manipulated. Further, the manipulations performed are often referred to in terms, such as producing, identifying, determining, or comparing. Any of the operations described herein that form part of the embodiments are useful machine operations. The embodiments also relate to a device or an apparatus for performing these operations. The apparatus can be specially constructed for the required purpose, or the apparatus can be a general-purpose computer selectively activated or configured by a computer program stored in the computer. In particular, various general-purpose machines can be used with computer programs written in accordance with the teachings herein, or it may be more convenient to construct a more specialized apparatus to perform the required operations.

The embodiments can also be embodied as computer readable code on a computer readable medium. The computer readable medium is any data storage device that can store data, which can be thereafter read by a computer system. Examples of the computer readable medium include hard drives, network attached storage (NAS), read-only memory, random-access memory, CD-ROMs, CD-Rs, CD-RWs, magnetic tapes, and other optical and non-optical data storage devices. The computer readable medium can also be distributed over a network coupled computer system so that the computer readable code is stored and executed in a distributed fashion. Embodiments described herein may be practiced with various computer system configurations including hand-held devices, tablets, microprocessor systems, microprocessor-based or programmable consumer electronics, minicomputers, mainframe computers and the like. The embodiments can also be practiced in distributed computing environments where tasks are performed by remote processing devices that are linked through a wire-based or wireless network.

Although the method operations were described in a specific order, it should be understood that other operations may be performed in between described operations, described operations may be adjusted so that they occur at slightly different times or the described operations may be distributed in a system which allows the occurrence of the processing operations at various intervals associated with the processing.

The foregoing description, for the purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the embodiments and its practical applications, to thereby enable others skilled in the art to best utilize the embodiments and various modifications as may be suited to the particular use contemplated. Accordingly, the present embodiments are to be considered as illustrative and not restrictive, and the invention is not to be limited to the details given herein, but may be modified within the scope and equivalents of the appended claims.

What is claimed is:

1. A safety system for an electric motor controller, comprising:
    a torque safety monitor having a status and failure processor separate and distinct from a second processor of a main motor controller, the torque safety monitor having one or more monitors associated with subsystems of a vehicle, the subsystems of the vehicle including at least one of a brake pedal assembly or an accelerator pedal assembly, the status and failure processor coupled to the one or more monitors to detect failure in the one or more monitored sub systems;
    a hardware protection unit coupled to the torque safety monitor and configured to couple to the main motor controller and a DC/AC (direct current to alternating current) inverter; and
    the status and failure processor configured to direct the hardware protection unit to modify switching signals that the hardware protection unit receives from the main motor controller, so as to decrease to nonzero value AC power, sent from the DC/AC inverter to an electric motor, in response to a detected failure in one or more monitored subsystems and an estimated torque of the electric motor differing from a commanded torque associated with the main motor controller by more than a set amount.

2. The safety system of claim 1, wherein the set amount is one from a set consisting of: a fixed constant, a variable dependent upon motor speed, and a variable dependent upon vehicle speed.

3. The safety system of claim 1, further comprising:
the hardware protection unit configured to modify the switching signals from the main motor controller, destined for the DC/AC inverter, to modified switching signals representing reduced nonzero AC power, in response to the first processor directing to decrease to nonzero value the AC power sent from the DC/AC inverter to the electric motor.

4. The safety system of claim 1, further comprising:
the status and failure processor configured to receive a plurality of status parameters and to output system status information and a protection directive, the system status information and the protection directive based upon the plurality of status parameters.

5. The safety system of claim 1, wherein a predetermined delay is applied to the commanded torque, the predetermined delay compensating for a path delay of the estimated torque.

6. The safety system of claim 1, wherein the main motor controller and the torque safety monitor are configured to receive a first current measurement of the AC power from a first type of current sensor and the torque safety monitor is configured to receive a second current measurement of the AC power from a second, differing type of current sensor.

7. The safety system of claim 1, further comprising:
the torque safety monitor configured to monitor at least one from a set consisting of: an accelerator pedal, a brake pedal, a motor speed, and a stator current.

8. The safety system of claim 1, further comprising:
the status and failure processor further configured to decrease a maximum commanded torque, as an output of the torque safety monitor, in response to the estimated torque of the electric motor differing from the commanded torque associated with the main motor controller by more than the set amount.

9. A safety system for a vehicle, comprising:
a torque safety monitor, distinct from a main motor controller of a vehicle;
a hardware protection unit coupled to the torque safety monitor and configured to couple to the main motor controller and a DC/AC (direct current to alternating current) inverter;
the torque safety monitor including a torque estimator that produces an estimated torque from inputs including a measurement of a stator current of a motor and a rotational speed of the motor, the motor controlled by the main motor controller via the torque safety monitor;
the torque safety monitor including one or more monitors associated with subsystems of the vehicle, the subsystems of the vehicle including at least one of a brake pedal assembly or an accelerator pedal assembly;
the torque safety monitor including a torque monitor that performs a comparison of the estimated torque and a commanded torque, the commanded torque an input to the main motor controller; and
the torque safety monitor including a status and failure processor operable to output a protection directive based on a detected failure in one or more monitored subsystems and the comparison of the estimated torque and the commanded torque, the protection directive directing the hardware protection unit to modify switching signals from the main motor controller to decrease, to a nonzero level, AC (alternating current) power delivered to the motor.

10. The safety system of claim 9, further comprising:
the hardware protection unit having as inputs the switching signals from the main motor controller and having as outputs modified switching signals to the DC/AC inverter, the modified switching signals produced in accordance with the protection directive.

11. The safety system of claim 9, further comprising:
the hardware protection unit having a switching protection gate and a fault status processor;
the switching protection gate receiving the protection directive from the torque safety monitor and receiving a fault parameter from a DC/AC (direct current to alternating current) inverter;
the switching protection gate receiving the switching signals from the main motor controller and outputting modified switching signals to the DC/AC inverter;
the switching protection gate setting the modified switching signals equal to the switching signals in response to the fault parameter indicating no fault in the DC/AC inverter and the protection directive indicating agreement between the estimated torque and the commanded torque; and
the switching protection gate setting the modified switching signals to reduced but nonzero power levels of the DC/AC inverter in response to the fault parameter indicating a fault in the DC/AC inverter or the protection directive indicating disagreement between the estimated torque and the commanded torque.

12. The safety system of claim 9, further comprising:
the torque safety monitor including a first monitor configured to receive a first sensor value from an accelerator pedal assembly and to detect a ground or power supply fault of the accelerator pedal assembly; and
the torque safety monitor including a second monitor configured to receive a second sensor value from a brake pedal assembly and to detect a ground or power supply fault of the brake pedal assembly.

13. The safety system of claim 9, further comprising:
the torque safety monitor including a third monitor configured to receive a vehicle speed value from a vehicle speed sensor and the rotational speed of the motor from a motor speed sensor and to detect a discrepancy therebetween exceeding a predetermined tolerance.

14. The safety system of claim 9, further comprising:
the torque safety monitor including a fourth monitor configured to receive a measurement of a stator current from a first current sensor and a measurement of the stator current from a second current sensor, the first current sensor and the second current sensor having differing types.

15. The safety system of claim 9, further comprising:
the torque safety monitor including a plurality of monitors coupled to the status and failure processor;
each monitor of the plurality of monitors receiving a sensed value relating to the motor or the vehicle and communicating a status to the status and failure processor; and
the status and failure processor further operable to output an aggregated status relating to a status of one or more of the plurality of monitors.

16. The safety system of claim 9, further comprising:
the torque monitor having a maximum commanded torque as an output;
the torque monitor producing a delayed commanded torque from the commanded torque;
the torque monitor setting the maximum commanded torque equal to a present value of the commanded torque in response to the estimated torque equaling the delayed commanded torque to within a specified amount; and the torque monitor setting the maximum commanded torque equal to a lesser of the estimated torque and the present value of the commanded torque in response to the estimated torque differing from the delayed commanded torque by more than the specified amount.

17. A method of monitoring an electric motor, comprising:
receiving parameters associated with one or more subsystems, the subsystems including at least one of a brake pedal assembly or an accelerator pedal assembly;
receiving switching signals from a main motor controller;
comparing an estimated torque of an electric motor to a commanded torque; and
modifying the switching signals, in a hardware protection unit, so as to produce modified switching signals that direct reduced but nonzero power level switching signals for a DC/AC (direct current to alternating current) inverter, in response to the estimated torque of the electric motor differing from the commanded torque by a preset amount and in response to a detected failure in one or more monitored subsystems.

18. The method of claim 17, further comprising:
producing a first measured value of a stator current of the electric motor from a first type of current sensor, for the main motor controller;
producing a second measured value of the stator current of the electric motor from a second, differing type of current sensor; and
producing the estimated torque from the second measured value of the stator current of the electric motor and a measured value of a rotational speed of the electric motor.

19. The method of claim 17, further comprising:
detecting a ground or power supply fault in one from a set consisting of: an accelerator pedal assembly, a brake pedal assembly, a vehicle speed sensor, and a motor rotational speed sensor; and
reporting the ground or power supply fault to a vehicle control unit.

20. The method of claim 17, further comprising:
detecting a first discrepancy between a vehicle speed and a motor speed;
detecting a second discrepancy between stator current measurements from a first sensor and a second sensor; and
reporting the first discrepancy or the second discrepancy to a vehicle control unit.

* * * * *